United States Patent [19]
Kienholz

[11] 3,965,614
[45] June 29, 1976

[54] APPARATUS FOR SPROUTING SEEDS

[76] Inventor: Karl E. Kienholz, 4400 Loch Alpine Drive, W., Ann Arbor, Mich. 48103

[22] Filed: Nov. 28, 1975

[21] Appl. No.: 635,969

[52] U.S. Cl. .................................. 47/14; 47/1.2; 47/34.12
[51] Int. Cl.² .......................................... A01C 1/02
[58] Field of Search ............... 47/1.2, 34, 34.12, 14, 47/15, 16

[56] References Cited
UNITED STATES PATENTS

| 984,746 | 2/1911 | Brown .................................. 47/14 |
| 1,688,407 | 10/1928 | Wastak .................................. 47/14 |
| 2,542,555 | 2/1951 | Moores .............................. 47/34.12 |
| 3,906,663 | 9/1975 | Peng et al. ............................ 47/14 |

FOREIGN PATENTS OR APPLICATIONS

| 316,294 | 3/1933 | Italy ..................................... 47/14 |
| 22,322 | 5/1922 | United Kingdom .................... 47/16 |
| 867,118 | 5/1961 | United Kingdom .................... 47/16 |
| 1,274,416 | 5/1972 | United Kingdom .................... 47/14 |

OTHER PUBLICATIONS

House Beautiful "The Bean Sprout" pp. 178–180; The Soybean has all the Answers, pp. 174–175, vol. 101, No. 5, May 1959.

Primary Examiner—Edgar S. Burr
Assistant Examiner—James R. Feyrer
Attorney, Agent, or Firm—Olsen and Stephenson

[57] ABSTRACT

Germinating apparatus for sprouting seeds such as bean sprouts or the like. The apparatus is comprised of a vertical arrangement of alternately stacked base members and dish members with base members forming the top and bottom members of the arrangement. The base members are formed having an imperforate top wall with a recessed portion for retaining water, and a downturned peripheral side wall flaring outwardly and terminating below the top wall. The dish members are formed having a foraminous bottom wall on which the beans are dispersed, and an upturned peripheral side wall flaring outwardly and terminating above the bottom wall. Support means are provided for maintaining the foraminous bottom wall of each dish member a preselected distance above the recessed portion of the base member immediately therebelow so that the beans can be maintained in spaced relation to the surface of the water in the recessed portion of the base member. Means for maintaining ventilation gaps around the upper periphery of each upturned peripheral side wall are provided to enable fresh air to circulate around the bean sprouts. An additional ventilation duct is formed in the bottom wall of each dish member to further enhance moist air circulation between the bean sprouts and the water on the subjacent base member. The base members and dish members respectively have similar configurations so they can be nested together for storage or other purposes.

11 Claims, 7 Drawing Figures

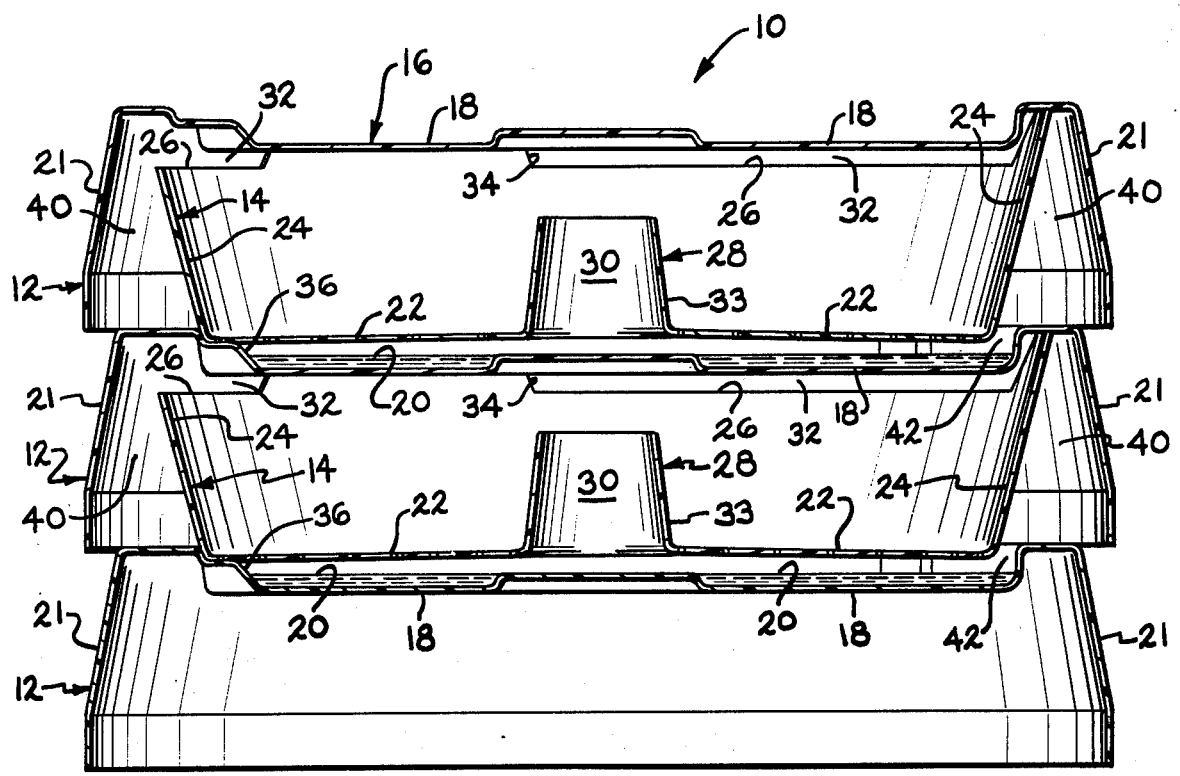
FIG. 3
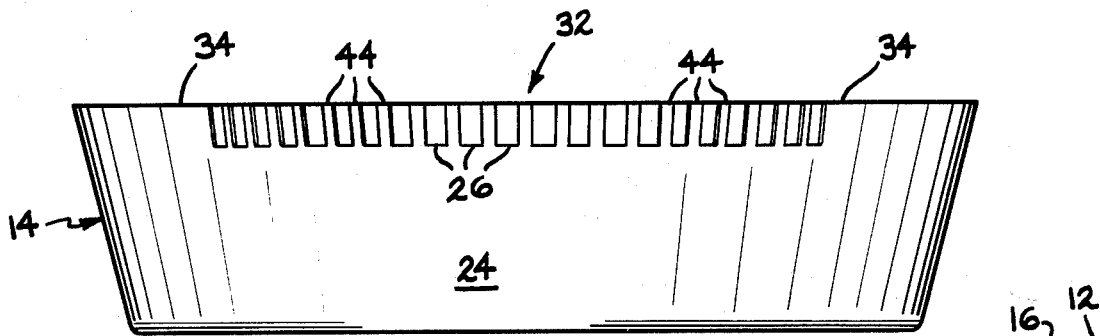
FIG. 4
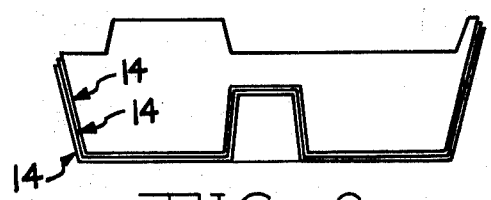
FIG. 7
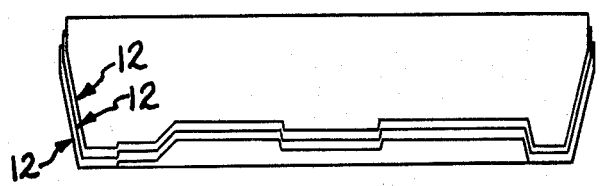
FIG. 5
FIG. 6

APPARATUS FOR SPROUTING SEEDS

BACKGROUND OF THE INVENTION

The present invention provides apparatus for growing sprouts from the seeds of legumes, grains and vegetables in a simple efficient manner. Bean sprouts, grown from soy or mung beans, have recently become a popular addition to the diets of many people. Previously, such sprouts have been served primarily in oriental dishes and in the diets of people who prefer health foods.

The growing popularity of oriental cooking in this country along with increasing consciousness of good nutrition has increased the demand for the nutritional, low calorie bean sprouts. As a result, it has been discovered that bean sprouts which have a fine distinctive flavor are a tasty addition to salads, soups, omelets, bread and other well known dishes.

Bean sprouts are grown commercially for sale to the consumer and although such commerical production and sale has been adequate, the bean sprouts are easily perishable and may lose their nutritional value and natural crispness in handling prior to consumption. Freshly grown sprouts assure high nutrition and excellent flavor and the freshest sprouts are those that are home grown and consumed as soon as they are the proper size. The sprouts thereby produced provide an excellent source of protein at relatively low cost. Further from the ecology standpoint, home grown sprouts eliminate the need for expending energy to harvest field crops and to package, transfer and market such products.

Units for growing sprouts at home have been developed, but all are plagued with one or more drawbacks. Some units require excessive space, others are clumsy to handle. Many units utilize complex mechanisms to maintain a high humidity environment and ventilation for the sprouts. Other growing units inconvenience and perplex the grower by requiring troublesome procedures to be carried out. Still others, including the most popular units now available for home use, fail to provide optimum sprouting environment.

SUMMARY OF THE INVENTION

The present invention has overcome the limitations and inadequacies of the prior art and provides a germinating unit in which an environment ideally suited for the sprouting of seeds can be maintained with a minimal amount of effort by the grower.

In one embodiment of the present invention, the germinating apparatus is composed of a plurality of base members and dish members alternately stacked in a vertical arrangement with base members forming the top member and the bottom member of the vertical arrangement. Each base member is similarly shaped to facilitate their use and also so that a plurality of base members and dish members may be nested for storage and shipping purposes.

Each base member is formed having an imperforate top wall with a downturned peripheral side wall extending therefrom. The top wall has a recessed portion formed therein in which a small amount of water is retained. Water is placed on all base members except the topmost member of the vertical arrangement to assure that the air surrounding the bean sprouts has a high moisture content.

Each dish member is formed having a foraminous bottom wall on which the beans or the like are dispersed and an upturned peripheral side wall which flares outwardly and upwardly from the bottom wall. Each dish member is supported a preselected distance above the recessed portion of a subjacent base member by such support means as peripheral shoulders formed in the top wall of the base member so that the beans are in spaced relation with the surface of water therebelow.

A base member is stacked on top of a dish member to form a cover for that dish member and to support another dish member. Ventilation means, such as upward extensions, are formed around the upper periphery of the upturned side walls of each dish member to define a series of ventilation gaps between the top border of the side wall of the dish member and the top wall of the upper adjacent base member. The downturned peripheral side wall of each base member overlaps in spaced relation the upturned peripheral side wall of the subjacent dish member so that when the base and dish members are stacked in vertical arrangement, the interior of each dish member will be shielded from external sources of light and a high humidity environment can be maintained. Each dish member also has a ventilation duct formed through its bottom wall to aid in maintaining a high humidity atmosphere around the beans.

It is the principal object of the present invention to provide germinating apparatus in which bean sprouts can be efficiently grown, which occupies minimal space, which can be easily disassembled and stored in a small space, which maintains high moisture air around the sprouts, which allows a well ventilated environment around the sprouts to exist, and which prevents exposure of the bean sprouts to undesirable light.

Further objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is a vertical sectional view of the germinating apparatus taken substantially on line 3—3 in FIG. 1;

FIG. 4 is a side view of a modified form of a dish member;

FIG. 5 is a vertical sectional view of a plurality of base members inverted and nested together for storage or shipping purposes;

FIG. 6 is a vertical sectional view of a plurality of dish members nested together for storage or shipping purposes; and FIG. 7 is a fragmentary sectional view of a modified form of a base member of the present invention.

DESCRIPTION OF THE PREFERRED EMBODIMENT

Figure 1:
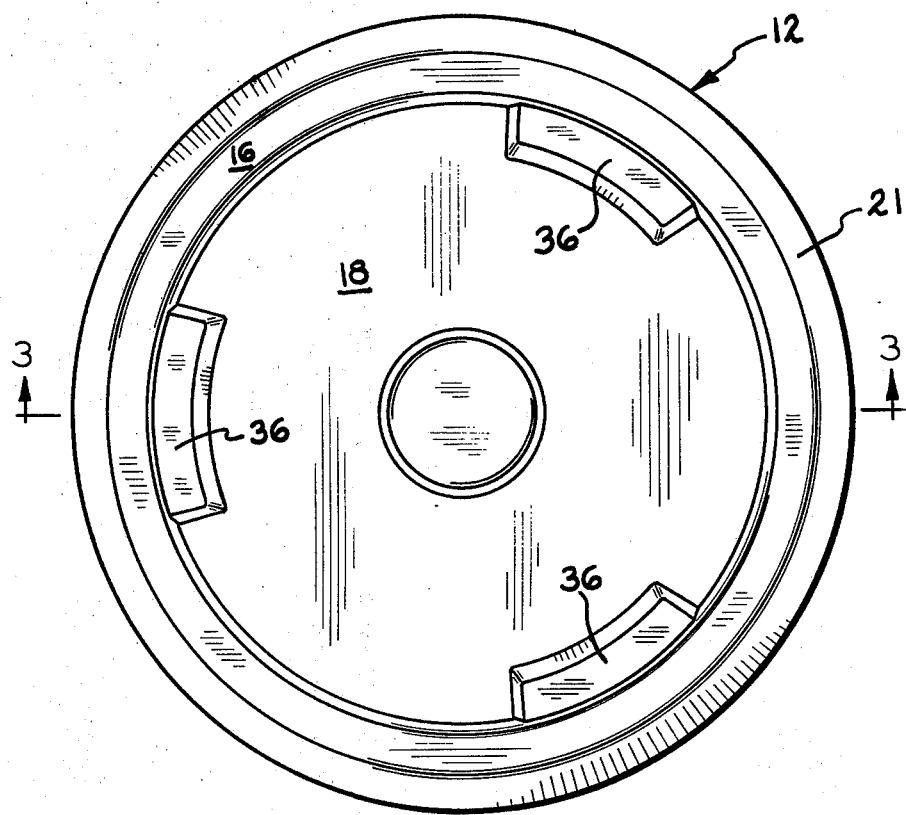
FIG. 1 is a top plan view of the germinating apparatus of the present invention showing the top wall of a base member.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. As shown in FIG. 3, the germinating apparatus 10 is comprised of base members 12 and dish members 14 alternately stacked in a vertical arrangement with base members 12 forming the top and bottom members of the arrangement. This vertical grouping of base members 12 and dish members 14 requires minimal surface space be used on which the unit 10 is supported while enabling the objects of the present invention to be attained.

Although three base members 12 and two dish members 14 are shown in FIG. 3, as comprising the vertical arrangement, it is within the purview of the present invention that more or less dish and base members may be used in a vertical arrangement.

Each base member 12, formed from such suitable material as plastic or the like which can filter out undesirable light rays, comprises an imperforate top wall 16 having a recessed portion 18 for retaining a surface of water 20 thereon. A downturned peripheral side wall 21 flares outwardly from and terminates below the top wall 16.

A plurality of inverted base members 12 are shown in FIG. 5; the outwardly flaring downturned side wall 21 of each base member 12 forms a configuration which is similar to other base members 12 and which enables a plurality of base members 12 to be nested together in a relatively small space for storage or shipping.

Figure 2:
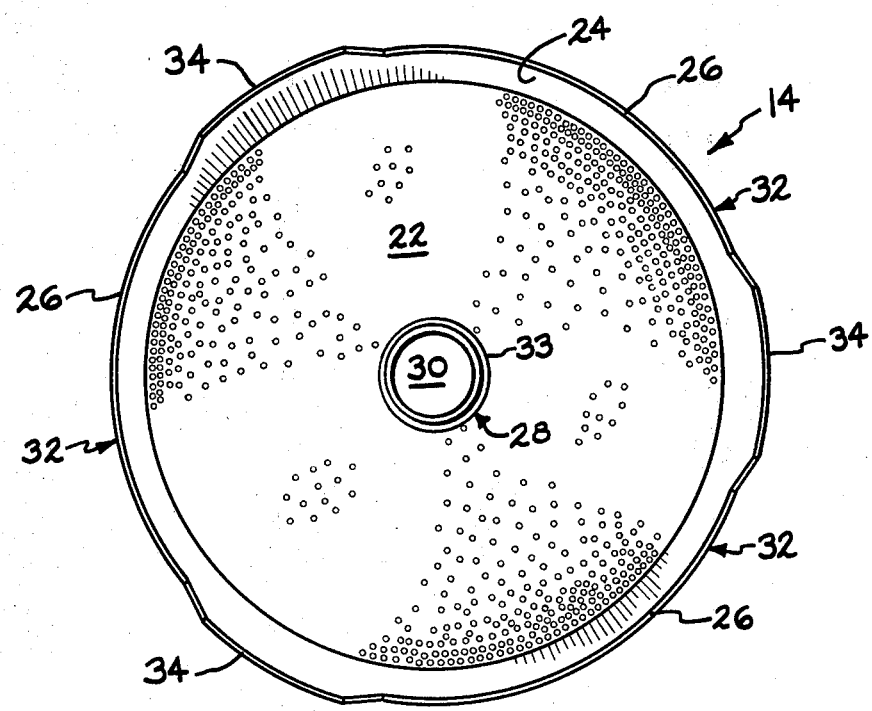
FIG. 2 is a top plan view of a dish member of the present invention.

All dish members 14 are also formed into similar configurations so that they can be nested together for storage and shipping, as shown in FIG. 6. Each dish member 14 comprises a foraminous bottom wall 22 (FIGS. 2 and 3) on which beans or the like can be dispersed for growing sprouts. The perforations through the bottom wall 22 are small enough so that water can pass through them during a rinsing operation, but the surface tension of any water in the dish 14 must be broken before the water can drain through, as is explained hereinafter. An upturned peripheral side wall 24 flares outwardly and terminates above the bottom wall 22 to define a top border 26. The bottom wall 22 has a high density of such perforations along its outer periphery and the spacing between the perforations becomes progressively greater in the areas closer to the center of the bottom wall 22.

In the illustrated embodiment, each dish member 14 has a central portion 28 defining a ventilation duct 30, FIG. 3, which extends through the bottom wall 22. As can be seen in FIG. 3, the bottom wall 22 of each dish 14 slopes slightly downward in an outward radial direction from the central portion 28 and facilitates in the drainage of water from the dish 14. The central portion 28 comprises an upwardly extending and inwardly flaring tube section 33 integrally formed with the bottom wall 22. The top of the tube section 33 terminates below the top wall 16 of the base member 12 immediately above to assure that a high moisture atmosphere ventilates around the bean sprouts.

In the vertically stacked arrangement, the base members 12 and dish members 14 define ventilation means for maintaining ventilation gaps 32 around the upper periphery or top border 26 of each upturned peripheral side wall 24. The ventilation means is comprised of a plurality of upward extensions 34 (FIGS. 1 and 3) integrally formed with the top border 26 of each dish 14 so that the base member 12 immediately above the dish 14 is supported by the upward extensions 34, thus forming the gaps 32 which ensure the free movement of fresh air about the bean sprouts. In a preferred embodiment, three upward extensions 34 provide the necessary support for base 12 immediately above and as a result three gaps 32 are provided to allow passage of fresh air to the seeds. As will be explained further in greater detail, the radial dimensions of each dish member 14 are less than the radial dimensions of each base member 12 to enable each base member 12 to cover each dish member 14 and form a series of ventilation passageways which aid in providing the proper environment for the bean sprouts. The difference in radial dimensions also forms the gaps 42 between the bottom walls 22 and the top wall 16 of associated dish and base members to aid further in creating a high humidity environment.

As can best be seen in FIGS. 1 and 3, support means is provided to maintain the bottom wall 22 of each dish member 14 a preselected distance above the top wall 16 of the subjacent base member 12 and is comprised of spaced-apart shoulder members 36 integrally formed about the periphery of each top wall 16 so that the beans that are dispersed on the bottom wall 22 of the dish member 14 immediately above the base member 12 remain in spaced relation with the water 20 that is retained in the recessed portion 18 of the top wall 16 of the subjacent base member 12.

In use of the apparatus 10, assume that a supply of mung beans has been well soaked. The soaked beans are then dispersed on bottom walls 22 of each dish member 14. A base member 12, which forms the bottom member of the vertical arrangement is placed on any convenient location and a proper quantity of water 20 is poured in the recessed portion 18 so that the surface level of the water remains below the top of the shoulders 36 to assure that the beans remain above the surface of the water 20. A dish member 14 with the beans dispersed on its bottom wall 22 is then positioned on the shoulders 36 of the bottom member of the apparatus 10, as shown in FIG. 3. Another base member 12 is placed on the dish member 14 and serves as a cover for that dish member 14 and as a base member for a dish member 14 that will be positioned immediately thereabove.

Dish members 14 and base members 14 are alternately stacked in the vertical arrangement and the number that can be used varies, depending on the amount of beans and the number of dish members 14 and base members 12 available. A base member 12 forms the top member of the vertical arrangement functioning as the cover for the dish member 14 immediately therebelow, and each base member 12, except for the bottom and top members of the vertical arrangement, serves the dual function as a cover for the subjacent dish member 14 and as a base for the dish member 14 immediately above. The downturned side walls 21 of the base member 12 are spaced apart from and overlap the upturned side walls 24 of the dish members 14 immediately below and since the radial dimensions of the dish members 14 are less than the radial dimensions of the base members 12, a passageway 40 is formed between the upturned side wall 24 of each dish member 14 and the downturned side wall 21 of each base member 12 and extends from the gaps 32 to the gaps 42. Thus, ventilation of fresh air is assured and blockage of damaging light rays is afforded by such an arrangement.

As the sprouts are growing, it is necessary to occasionally rinse them by adding water into the dish members 14. Water flow is restricted by the small size of the holes in the foraminous bottom wall 22. This causes flooding in the dish which insures thorough, efficient rinsing and aids in the removal of husks and seeds which fail to sprout. To quickly remove the water, the dish member 12 is tilted, spilling the water through the gaps 32. Any remaining water is drawn through the perforations in the bottom wall 22 by rubbing the underside of the bottom wall 22 with one's hand thus breaking the surface tension of the water.

Since rinsing the bean sprouts is a necessary procedure that is performed in growing crisp bean sprouts, the arrangement of the dish and base members in the germinating apparatus 10 facilitates this operation. The top member of the arrangement, being a base member 12, is removed and with water placed in its recessed portion 18, it becomes the bottom member of the second arrangement. The top exposed dish member 14 is then removed and the rinsing procedure is carried out; that dish member 14 is then placed on the shoulders 36 of the bottom base member 12 of the second arrangement. The base member 12 which is now the topmost member of the first arrangement is then removed from and placed on the dish member 14 that is positioned on the second arrangement. This procedure is repeated until the bottom base member 12 of the first arrangement becomes the top member of the second arrangement. When another rinsing is required, the procedure is simply repeated.

In a modified form of the present invention, as shown in FIG. 4, a plurality of serrations 44 are integrally formed with the top border 26 of the upturned peripheral side walls 24 of each dish member 14 in the gaps 32 between the upward extensions 34 so that when the dish member 14 is filled with water to rinse the beans and when the water begins to flow over the top border 26, the serrations 44 retain the bean sprouts inside the dish member 14 while allowing the waste, debris, and shell material to wash away through the openings between the serrations 44. As the dish 14 is tilted to empty the water, the serrations 44 retain the bean sprouts inside the dish member 14 thus facilitating the rinsing procedure. In a preferred embodiment each of the three gaps 32 have serrations 44 that are uniformly spaced apart. However, in one gap 32 the serrations 44 are closely spaced apart, in the second gap 32, the serrations 44 are spaced farther apart and in the third gap 32 the serrations 44 are spaced still farther apart. During rinsing operations, this allows the grower the option of visually determining the proper gap 32 through which the greatest amount of debris and waste material can be eliminated while retaining the sprouts in the dish.

FIG. 7 shows a modified form of a base member 12 in partial sectional view wherein a plurality of ridges 46 are integrally formed in the recessed portion 18 of the top wall 16 of the base member 12. The ridges 46 hinder the flow of the water 20 on the recessed portion 18 to prevent spillage of water over the top wall 16.

It can thus be seen that an improved germinating apparatus 10 is provided which enables simple efficient home production of bean sprouts by utilizing base members 12 and dish members 14 alternately stacked in a vertical arrangement which uses minimal counter space. Seeds are dispersed in the dish members 14 and water 20 is retained on the base members 12 to provide a high humidity environment. The configurations of the base and dish members, along with the stacking arrangement, shields the bean sprouts from the damaging light of external sources and provides ventilation passageways that permit an ideal high moisture environment to exist in which beans or the like can germinate into sprouts that are ready to be consumed. The unit is light in weight and is easily moved. Several types of seeds can be simultaneously grown in different dishes in the vertical arrangement to suit the tastes and needs of the consumer.

It is claimed:

1. Germinating apparatus for sprouting seeds, legumes, grains or the like comprising a plurality of base members and a plurality of dish members adapted to be stacked alternately in a vertical arrangement with base members being the bottom and top members of the arrangement, said base members having similar configurations, each base member having an imperforate top wall with a recessed portion for retaining a surface of water thereon and a downturned peripheral side wall flaring outwardly from and terminating below said top wall, said dish members also having similar configurations, each dish member having a foraminous bottom wall on which beans or the like can be dispersed, and an upturned peripheral side wall flaring outwardly from and terminating above said bottom wall, said base members and said dish members defining support means for maintaining the bottom wall of each dish member a preselected distance above the recessed portion of the base member on which it is stacked so that beans or the like on a foraminous bottom wall can be maintained in spaced relation to the surface of the water in the recessed portion of the dish member immediately therebelow, and said base members and said dish members also defining ventilation means for maintaining ventilation gaps around the upper periphery of each upturned peripheral side wall.

2. The germinating apparatus that is defined in claim 1, wherein each of said dish members has a central portion defining a ventilation duct open at the bottom to the space below its foraminous bottom wall and open at the top to the space above its foraminous bottom wall for aiding in maintaining a condition of high humidity in each dish member when assembled with base members containing water in their recessed portions.

3. The germinating apparatus that is defined in claim 2, wherein the top of said ventilation duct terminates below the top wall of the base member immediately thereabove.

4. The germinating apparatus that is defined in claim 1, wherein the downturned peripheral side wall of each base member overlaps in spaced relation the upturned peripheral side wall of the dish member immediately therebelow so that when the base and dish members are stacked in said vertical arrangement, the interior of the dish member will be shielded from external sources of light so as to maintain darkness therein.

5. Germinating apparatus comprising a vertical arrangement of alternately stacked base members and dish members, one of said base members being the bottom member of said vertical arrangement, and another of said base members forming the top member of said vertical arrangement, each base member and its superposed dish member forming associated members, each base member including a substantially horizontal imperforate top wall terminating in a perimetric edge, said top wall being depressed from said perimetric edge to form a recessed portion in which fluids can be retained, said base member further including substantially vertical walls integrally formed with said perimetric edge and extending downward from said top wall, each dish member including a substantially foraminous bottom wall having a surrounding bottom border, said dish member further including substantially vertical walls integrally formed with said bottom border and extending upward therefrom terminating in a top border, the vertical walls and the bottom wall of said dish member defining a basin portion in which seeds can be placed, support means integrally connected with one of said associated members and engaging the other associated member to thereby maintain the bottom wall of said associated dish member in a spaced relation above the recessed portion of the associated base member so that a clearance is provided between the bottom wall of said associated dish and the fluid retained in the recessed portion of said associated base member, said support means further maintaining the associated members in spaced relation to provide a first ventilation gap between the bottom wall of said associated dish member and the perimetric edge of said associated base member to provide for air ventilation therebetween, each dish member and base member supported thereon including spacer means formed in one member and engaging the other member so that the top wall of the base member is maintained in spaced apart relation with the top border of the dish member to thereby provide a second ventilation gap, the vertical walls of each base supported on a dish member encompassing the vertical walls of the supporting dish member, the encompassing and vertical walls defining a ventilation passageway extending between the first and second ventilation gaps.

6. Apparatus that is defined in claim 5, wherein said support means comprises spaced-apart shoulder members integrally formed in the top wall adjacent the top edge of each base, each shoulder member being a predetermined height to support the bottom wall of a dish member in said spaced relation with the recessed portion of a supporting base member.

7. Apparatus that is defined in claim 5, wherein said spacer means comprises a plurality of spaced-apart upward extensions integrally formed in the top border of each dish member to maintain a superposed base member in spaced relation with said top border.

8. Apparatus according to claim 7 further including a plurality of closely spaced-apart serrations integrally formed with the top border of each dish member between said upward extensions.

9. Apparatus that is defined in claim 5, wherein the bottom wall of said dish member includes means defining at least one ventilation duct for providing ventilation between the recessed portion of the associated base member and the basin portion of said dish member.

10. Apparatus that is defined in claim 5, wherein the radial dimensions of the bottom wall of each dish member are smaller than the radial dimensions of the recessed portion of each base member.

11. Apparatus that is defined in claim 5, wherein the recessed portion of each base member is provided with a plurality of upwardly extending partitions to impede the movement of the fluid being retained on said recessed portion.

* * * * *